United States Patent [19]

Loose

[11] Patent Number: 4,499,383

[45] Date of Patent: Feb. 12, 1985

[54] EDGE DETECTION APPARATUS

[75] Inventor: Peter W. Loose, Chelmsford, England

[73] Assignee: European Electronic Systems Ltd., England

[21] Appl. No.: 368,511

[22] Filed: Apr. 15, 1982

Related U.S. Application Data

[63] Continuation-in-part of Ser. No. 210,337, Nov. 25, 1982, Pat. No. 4,490,617.

[30] Foreign Application Priority Data

Nov. 26, 1979 [GB] United Kingdom .................. 7940810
Mar. 19, 1980 [GB] United Kingdom .................. 8009285
Mar. 25, 1980 [GB] United Kingdom .................. 8010048

[51] Int. Cl.$^3$ .............................................. G01N 21/86
[52] U.S. Cl. .................................... 250/561; 250/560; 356/384
[58] Field of Search ............... 356/384, 385, 386, 387; 250/560, 561, 342

[56] References Cited

U.S. PATENT DOCUMENTS 2,659,823 11/1953 Vossberg, Jr. ...................... 250/560
3,907,439 9/1975 Zanoni ................................. 250/560
4,033,697 7/1977 Pfoutz et al. ......................... 250/560

Primary Examiner—David C. Nelms
Assistant Examiner—Ernest Austin, II
Attorney, Agent, or Firm—Lerner, David, Littenberg, Krumholz & Mentlik

[57] ABSTRACT

A method of determining the precise location of an edge of a strip with individual elements of a radiation responsive sensor to an accuracy exceeding the pitch of the elements is disclosed. The strip is scanned at least in the region of the edge with the individual elements of the radiation responsive sensor. Each element generates a signal value associated therewith for each scan and the signal values for all the elements form a composite signal having discrete values representative of radiation received form the scanned region at respective locations corresponding to the individual elements of the sensor. A region of interest where said edge is likely to lie is identified and the composite signal is analysed by defining a curve which when the values are plotted against the locations on a distance scale passes through the values to represent a radiation profile of the scanned region as received by the sensor. The point of maximum slope on the curve is then found and the corresponding position on the distance scale taken as representing the precise location of the edge.

35 Claims, 13 Drawing Figures

EDGE DETECTION APPARATUS

This application is a continuation-in-part of application Ser. No. 210,337, filed Nov. 25, 1982, now U.S. Pat. No. 4,490,617.

The present invention relates to a method of determining the precise location of an edge of a strip, particularly the edge of a strip being worked in a steel mill although it is applicable to any edge whose precise location is to be determined by means of a remote scanning device. The invention also relates to an apparatus for carrying out the method.

In the steel making industry it is necessary to know the precise width of a strip being rolled or otherwise worked. The strip is usually hot and its width may be determined by means of cameras scanning the strip. Canadian Pat. No. 1,103,018, issued June 16, 1981 to Peter Loose, describes an improved system for measuring the width of the strip where two cameras each scan the whole of the width of the strip and positional information is determined from the angular information derived from the two cameras.

A charge coupled device comprises an array of photosensitive elements, called pixels or photosites, which produce small packets of charge in dependence on the amount of light falling on them and the length of time for which it falls. The photosites may be arranged either in the form of a grid or in a line, but for edge detection purposes linear arrays are normally employed. In the case of strip whose width is to be measured, the strip is focussed on the linear array of photosites by means of a lens in the charge coupled device camera. The photosites are electronically scanned in the charge coupled device which generates an output consisting of a series of pulses having heights representing a line scan across the strip.

By analysing the signal representing the line scan, it is possible to determine the location of the edges of the strip relative to the charge coupled device. However, commercially available charge coupled devices currently have a maximum of two thousand and forty eight photosites in a linear array. These photosites are 13 microns square and the distance between centers, or pitch, is also approximately 13 microns, the inter photosite spacing being insignificantly small. Nonetheless, the limitation on the accuracy of measurement of the image of the strip formed on the charge coupled device by the lens is at best limited to 13 microns, the pitch of the photosites. In a steel rolling mill, the cameras normally have to be mounted about 3½ meters above the strip which is about 2 meters wide. If the lens is arranged so that the field of view of the camera in the strip just extends across the strip, there is apparently an inherent limitation on the ultimate accuracy of the device in the order of 1 millimeter, assuming there are 2,048 photosites in the charge coupled device. In practice, the actual error is greater than this because the lens does not form an absolutely sharp image of the lens on the charge coupled device and, in the case of a hot strip, the radiation profile does not obviously change abruptly from zero to maximum value at the position of the edge. Some cooling occurs at the edge of the strip and radiation is emitted from parts of the equipment outside the strip. Practical devices in the prior art were limited to an accuracy in the order of 6 to 8 millimeters which, given the rate at which steel passes through a rolling mill, constitutes a considerable unknown in the quantity of steel being processed.

In accordance with the prior art thinking therefore the limiting accuracy of measurement is determined by the limiting resolution of the charge coupled device camera which in turn is dependent on the pitch of the CCD elements.

A further problem in the prior art is that a complete line of information is analysed in order to determine the location of the edge in the scan. This is time consuming and makes it difficult to produce a continous indication of the positions of the edges of the strip in real time.

Accordingly the present invention provides a method of determining the precise location of an edge of a strip, comprising scanning the strip at least in the region of the edge with individual elements of a radiation responsive sensor, each said element generating a signal value associated therewith for each scan, said signal values for all the elements forming a composite signal having discrete values reprentative of radiation received from the scanned region at respective locations corresponding to the individual elements of the sensor, analysing said composite signal in said region of interest by defining a curve which when said values are plotted against said locations on a distance scale passes through said values to represent a radiation profile of the scanned region as received by the sensor, identifying a region of interest on said curve where said edge is likely to lie, finding the point of maximum slope on said curve in said region of interest, and taking the corresponding position on the distance scale as representing the precise location of said edge.

The invention makes use of the fact that the image of the strip on the sensor, usually a charge coupled device, is not perfectly sharp and in fact covers several photsites or elements of the device. By analysing the signal covering several photosites it is possible to determine the position of the actual edge of the strip in the image to an accuracy exceeding the pitch of the elements of the charge coupled device. Furthermore, since a region of interest is first identified where the edge is likely to lie, it is not necessary to analyse a complete line of informatiion in order to determine the position of the edge, resulting in a considerable saving in time. The whole operation can take place in real time and the invention is capable of providing a continuous read-out giving the width of a strip with a standard deviation in the order of 0.07 millimeters. This is considerably better than was thought to be possible in the prior art, given the inherent limitations resulting from the limiting resolution of charge coupled devices.

In a preferred embodiment a threshold value is defined on the composite signal adjacent the edge region and such that the actual edge is unlikely to lie at a photosite giving a signal below the threshold value. The threshold value may conveniently be set at 25% of the peak signal value. A processing unit then processes the composite signal moving along the photosites from the one at the threshold value differentiating as it goes to find the first point on the curve to the nearest photosite where the slope passes through a maximum. In the case of a rising edge the processing unit works successively along the photosites in ascending order. In the case of a trailing edge the processing unit works in descending order. Having foung the point of maximum slope the processing unit then defines upper and lower curve limit positions at which the slope has fallen to a predetermined fraction of its maximum value on either side of the position of maximum slope. The mean of the signal values at the upper and lower limit positions is calculated to give a signal value on said curve which is taken to be the point on the curve corresponding to the actual position of the edge. This position of the edge is found to an accuracy exceeding the photosite pitch by noting the photosites immediately enclosing the mean signal value and then effecting a linear interpolation between the enclosing photosites.

In an alternative embodiment the upper and lower curve limit values are defined as above and the actual position of the edge is found by determining the centre of gravity of the curve between the upper and lower curve limit positions. The slope dy/dx and the moment of slope (dy/dx)DX are determined at each photosite between the upper and lower curve limit positions and respectively summed. The sum of the moments of slope is then divided by the sum of the slopes to find the centre of gravity of the curve and this gives the actual position of the edge directly as a fraction of the photosite pitch.

In a further embodiment the processing unit finds the best fit function $y=f(x)$ in the region of interest, sets the second order differential to zero to find the point of inflection and solves for x to find the actual position of the edge again directly as a function of the photosite pitch.

The invention will now be described in more detail, by way of example only, with reference to the accompanying drawings, in which.

Figure 1:
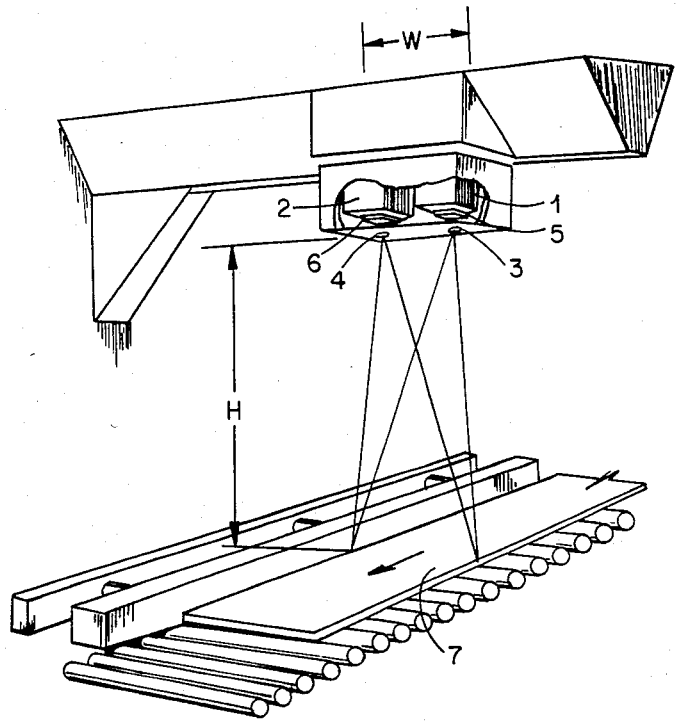
FIG. 1 illustrates an edge detection apparatus mounted over a strip being rolled in a steel mill.

As shown in FIG. 1, a pair of spaced charge-coupled-device (CCD) cameras 1,2 are mounted at a height H, which is approximately 3½ meters, above a two-meter wide hot steel strip 7 emerging from a rolling mill. The cameras 1,2 have lenses 3 and 4 which form an image of the strip on respective charge coupled devices 5 and 6. The cameras 1,2 are housed in a water-cooled jacket to protect them from the heat radiating from the strip 7. Each charge coupled device comprises a linear array of 2,048 photoelements, also known as photosites or pixels. A suitable charge-coupled-device is Fairchild's CCD device number 143. As described in the above-referenced Canadian Pat. No. 1,103,018, the cameras 1 and 2 each scan the whole width of strip 7. Although the strip is shown as lying flat on its supporting bed, buckling may occur and the use of two spaced-apart cameras in this manner enables the precise position in space of the edge of the strip to be determined even when the strip is not lying flat on the supporting bed.

Figure 2A:
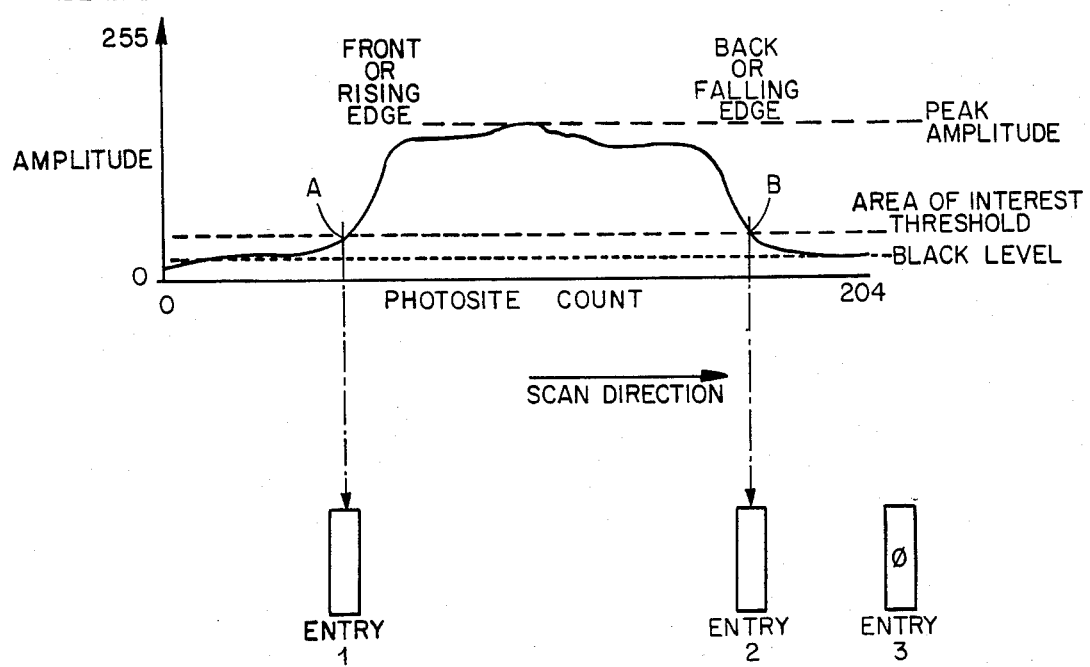
FIG. 2a represents a typical radiation profile from a hot strip being rolled.
Figure 2B:
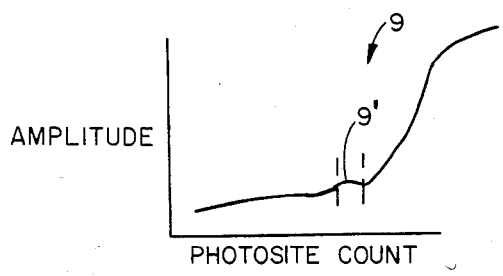
FIG. 2b represents a typical radiation profile from a hot strip with edge cracking.
Figure 2C:
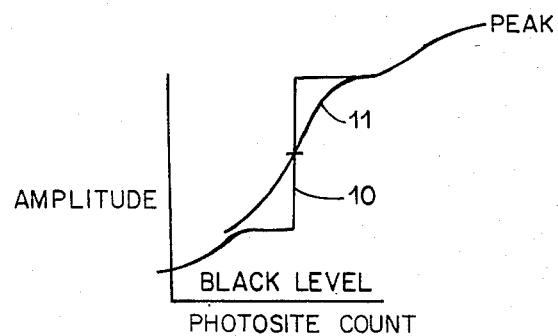
FIG. 2c illustrates how an abrupt intensity change is symmetrically blurred by a lens.

In this embodiment, the cameras 1 and 2 are responsive to the radiation emitted by the hot strip. This generally has a profile as shown in FIG. 2a. As each camera scans across the strip, the radiation level is initially low outside the strip, rises quite sharply in the first edge region, levels off in the middle of the strip near a peak value, falls again quite sharply in the second edge region and finally falls to the background level outside the strip. The regions of interest lie in the circled references 8 and 9. In these regions the radiation level changes rapidly and it is here that the actual edges of the strip lie. The profile shown in FIG. 2a represents the radiation profile of the image of the strip projected onto the charge-coupled device. The actual radiation from the strip exhibits a fairly sharp step at the edge position, even though cooling of the strip takes place at the edges, but this is distorted substantially symmetrically about the edge position as the result of the defocussing effect of the lenses 3 and 4. This is shown more clearly in FIG. 2c where line 10 shows the step which would occur at an idealized edge and line 11 shows how the step is blurred in the image of the strip owing to the defocussing effect of the lens which will have a characteristic transfer function. In some cases cracking occurs at the edge of the strip and gives rise to a local peak at the base of the edge-region curve as shown in FIG. 2b. The edge detection apparatus can be adapted to take this into account as will be discussed below.

Figure 6:
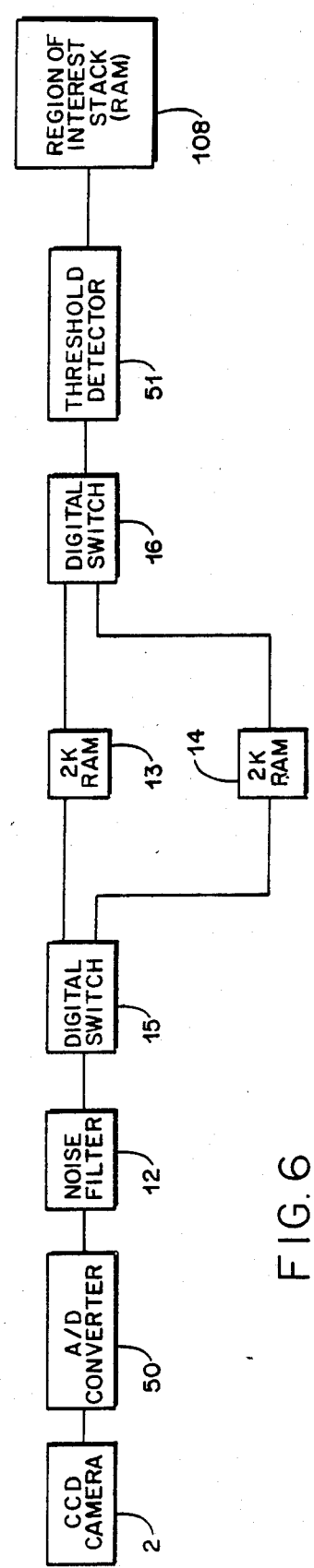
FIG. 6 is a block diagram of an input stage of the edge detection apparatus.

In practice each camera generates a series of sequential pulses for each scan, each representing the amplitude level at the respective CCD photosites numbered from 0 to 2047. The first signal pulse represents the amplitude of light falling on photosite number 0, the second on photosite number 1 sequentially through to photosite number 2047. The pulse amplitudes are digitized and represented by a number from 0 to 255. Thus, in FIG. 2a, the y axis represents discrete amplitude levels having values from 0 to 255 and the x axis represents discrete photoelement locations having numbers from 0 to 2047. As shown in FIG. 6 (which shows the circuitry for the camera 2), the output of each camera is fed to an analog-to-digital converter 50, which is actually mounted in the camera housing above the hot strip, to form an eight-bit digital word which in turn is fed to a noise filter 12 where characteristic random noise associated with each camera is removed. When the equipment is initially set up a neutral background is scanned to determine the noise signature of the cameras and then this is used to calibrate the filter 12. The output of the noise filter 12 is connected alternately to 2k*8 random-access memories 13 and 14 through an electronic switch 15. The RAMs 13 and 14 are arranged to store alternate scans across the strip from the camera and each holds a complete line of information. An electronic switch 16 operates in synchronism with the electronic switch 15 and is so arranged that while a line of information from the camera is being written into the RAM 13, the information in the RAM 14 representing the previous line is analysed by means of circuitry to be described. Furthermore, in practice, since the gain from one element to the next may vary, but the alternate elements of the charge-coupled are matched, signals from alternate elements are analysed separately to avoid the superimposition of a signal having a wavelength related to the pitch of the photoelements.

The RAMs 13 and 14 are connected alternately to the threshold detector 51 by the electronic switch 16. The digital words representing the amplitude levels at the successive photosites are sequentially accessed and fed to the threshold detector 51 which determines whether the signal is above a predetermined threshold 17 as shown in FIG. 2a. The threshold may be conveniently set to 25% of the peak signal value 18 in FIG. 2a. The exact threshold value can be determined by experiment, but the closer it can be to the actual position of the edge, the shorter the processing time for analysing the CCD signals. The region of interest stack stores the photosite positions where the amplitude level crosses the predetermined threshold, i.e. the photosite positions corresponding to the points A and B in FIG. 2a. Further transitions through the threshold may occur owing the the presence of water droplets and the like on the steel. These are also stored by the region of interest stack and discarded during subsequent processing.

Figure 7A:
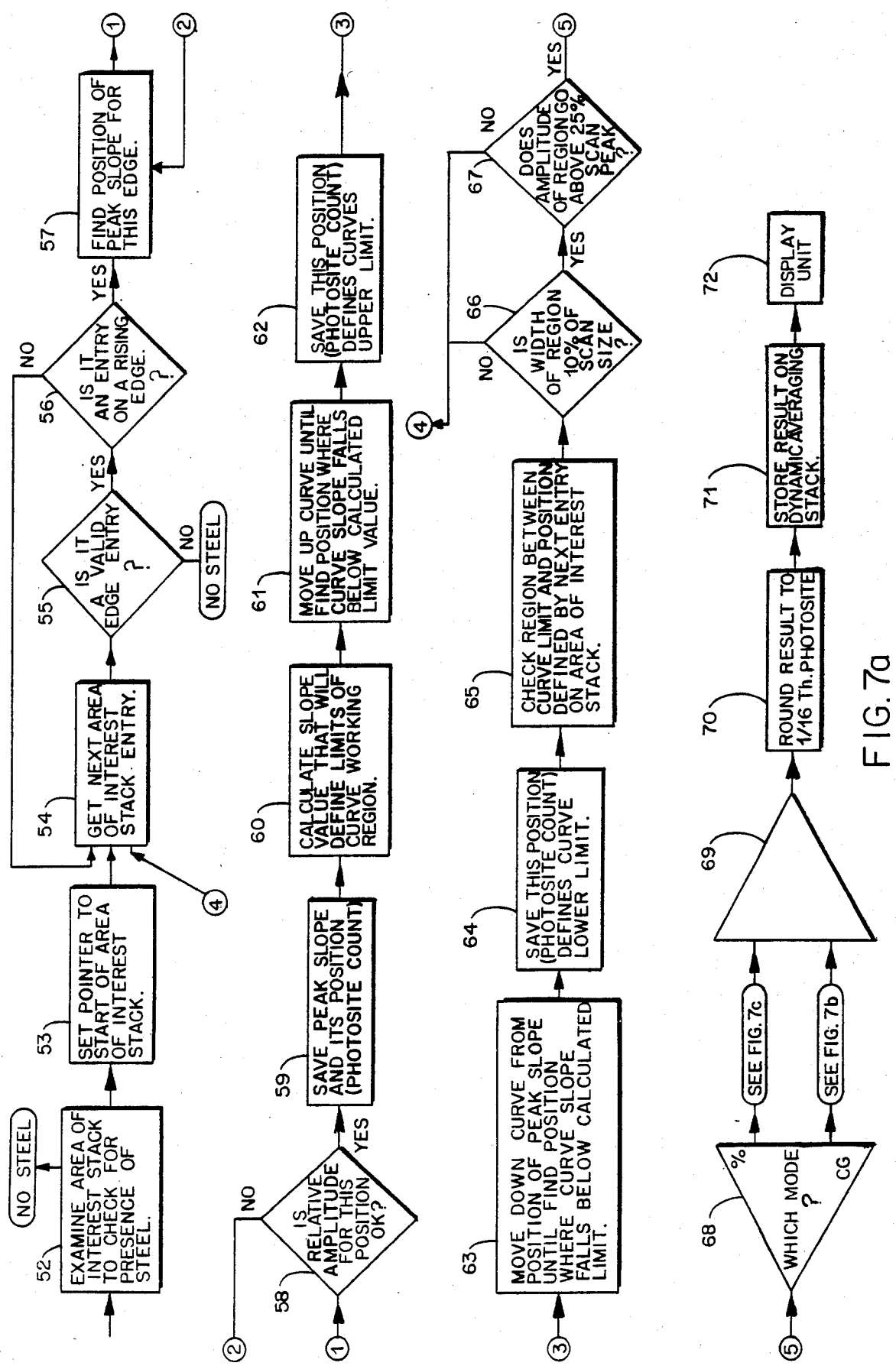
FIG. 7a is a block diagram illustrating the operation of one embodiment of edge detection apparatus according to the invention.
Figure 7B:
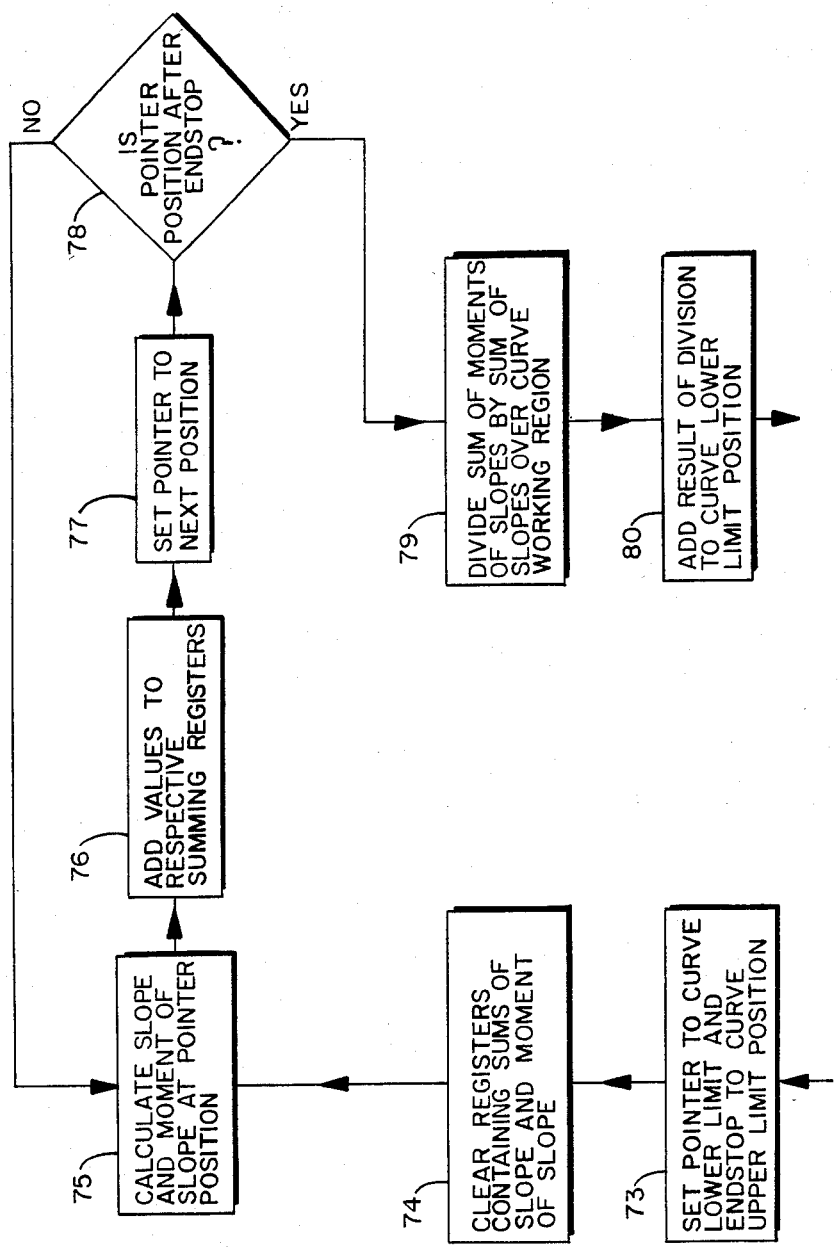
FIG. 7b is a block diagram illustrating the operation of apparatus employing the linear interpolation method.
Figure 7C:
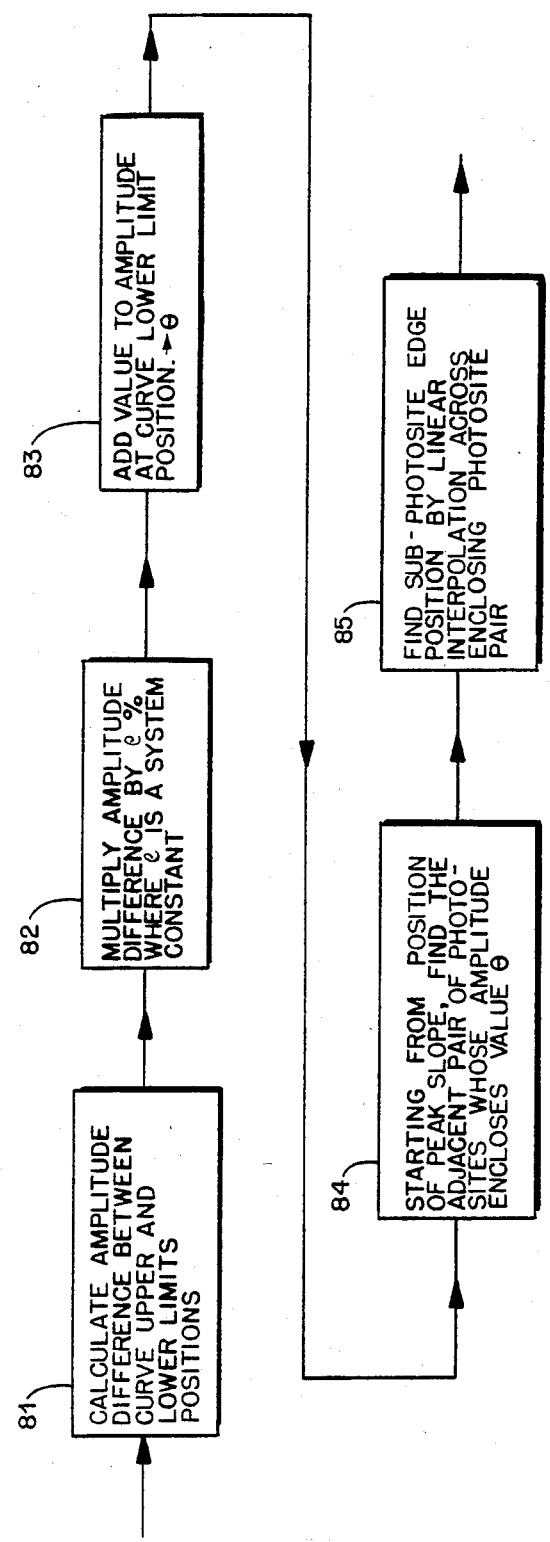
FIG. 7c is a block diagram illustrating the operation of the apparatus employing the center of gravity interpolation method.

The mode of operation of the apparatus to locate the precise position of a rising edge will now be described with reference to FIGS. 7a through 7c. As shown in FIG. 7a, unit 52 first examines the region of interest stack 108 to check for the presence of steel. If steel is present, unit 53 controlling the accessing of the region of interest stack 108 passes the entry to unit 54 where it is examined by unit 55 to check that the entry is on a rising edge. The photosite elements are then examined sequentially in ascending order in unit 57 by comparing the signal values at adjacent photosites until the position of maximum slope is found. If unit 58 confirms that the amplitude is acceptable the value of the peak slope and its position are stored in the unit 59. A predetermined fraction of this slope is then calculated in unit 60 and the photosites where the values of the slope fall to this predetermined fraction on either side of the photosite where the slope has its peak value are found by units 61 and 63 and stored in units 62 and 64 respectively. Units 65, 66 and 67 check whether the distance from the positions calculated in units 61 and 63, and combined in some suitable manner, such as by taking their average value, is at least ten percent of the scan size and the amplitude in this region exceeds twenty-five percent of the scan peak. The selection of the mode of interpolation is then effected by unit 68.

Figure 3:
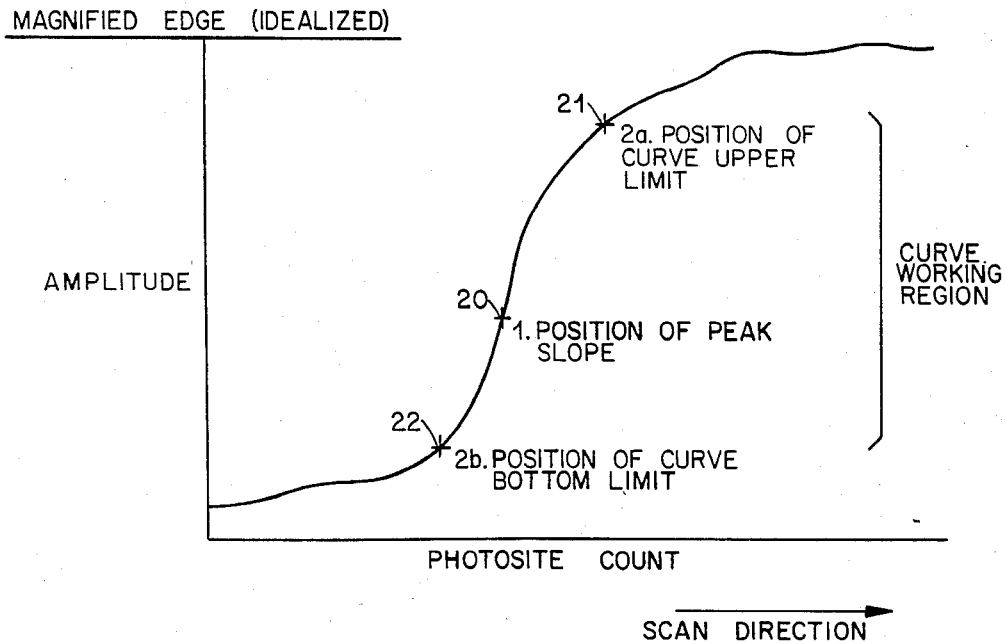
FIG. 3 is an enlarged view of the encircled portion of the curve shown in FIG. 2a representing a region of interest in which an edge of a strip is likely to lie.

In FIG. 3 the position of the peak slope is referenced 20 and the upper limit of the working curve is referenced 21 and this corresponds to the photosite where, in this example, the slope of the curve has fallen to 50% of the slope at point 20 which corresponds to the photosite where the slope is a maximum. Point 22 indicates the lower limit of the working curve on the other side of the point 20 where the slope has also fallen to 50% of its peak value.

For detection of the edge in the region of interest 8, a similar procedure is followed except of course the photosites are examined in descending order from the theshold point B in FIG. 2 until the position of maximum slope is found. The upper and lower curve working limits are then defined by finding the photosites where the slope has fallen to a predetermined fraction of this maximum value on either side of the central photosite.

Figure 4A:
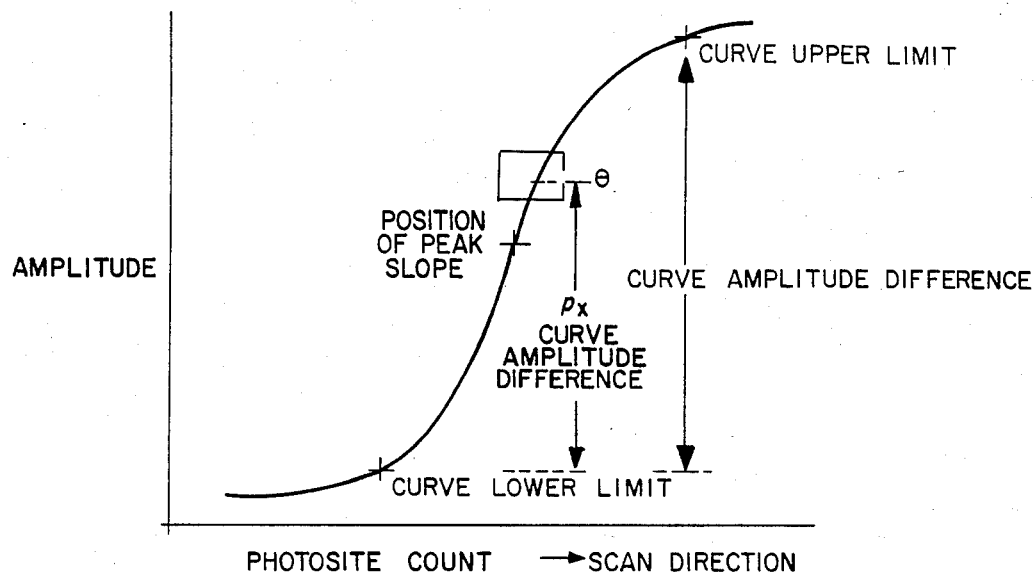
FIG. 4a is an idealized representation of this edge region.
Figure 4B:
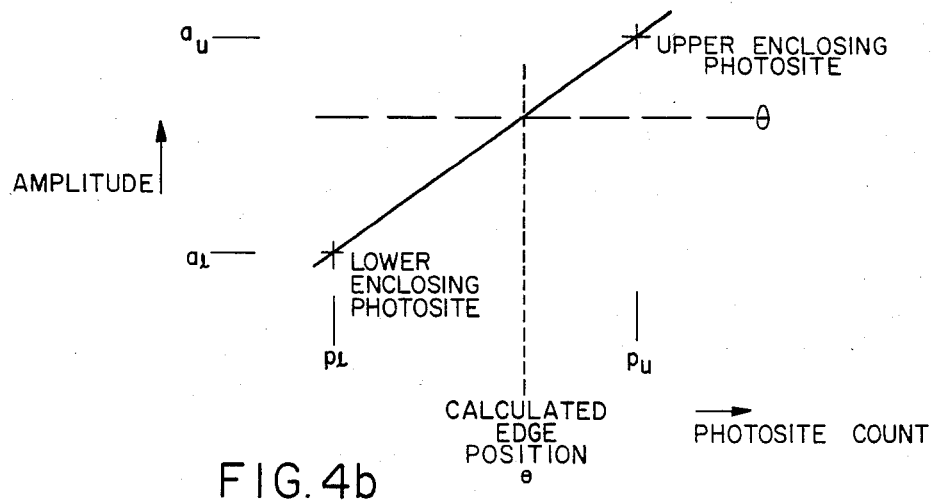
FIG. 4b is a diagram illustrating the linear interpolation method employed in one embodiment of the invention.

The precise location of the edge is then determined by analyzing the signal within the defined working region. As can be seen in FIG. 4, the position of maximum slope generally corresponds to the precise position of the edge of the strip. The curve shown in FIG. 4a, although shown as a continuous curve, is in fact of course composed of a series of discrete values representing the signal levels at the photosites of the charge-coupled device. The discrete values are spaced by a distance equal to the pitch, i.e., the distance between the centers, of the photosites. The position of peak slope of the curve passing through the discrete signal values may be determined by linear interpolation to an accuracy exceeding the photosite pitch. When this method is selected unit 81 of FIG. 7c calulates the amplitude difference between the signal values at the upper and lower curve limit positions of the curve in the defined working region. Unit 82 then multiplies this difference by a system constant rho, normally ½. The result is then added to the amplitude of the signal at the lower curve limit in unit 83. This defines a signal value which, assuming rho is ½, represents the mean value theta of the amplitudes of the signal values at the upper and lower curve limits. It is unlikely that this signal value will correspond exactly to the location of a photosite in the working region. The curve is examined in unit 84 to locate the photosites which have associated signal values immediately surrounding the calculated mean value theta. As indicated in FIG. 4b, these photosites are referred to as the lower and upper enclosing photosites respectively. If the amplitude and photosite count of the lower and upper enclosing photosites are respectively $a_l$, $p_l$ and $a_u$, $p_u$ and the calculated mean signal value is $\theta$, the exact position of the edge e may be calculated by linear interpolation as a fraction of the photosite count from the following relation:

$$(\theta - a_l / a_u - a_l) = (e - p_l / p_u - p_l).$$

The result of this calculation is rounded to 1/16 of a photosite in unit 70 (FIG. 7a) and stored in a dynamic averaging stack 71 which continuously averages the result of this analysis. The value stored in the dynamic averaging stack 71 is displayed in the display unit 72. It may also be continuously recorded on a chart recorder or used as a feedback signal to control the rolling operation.

Figure 4C:
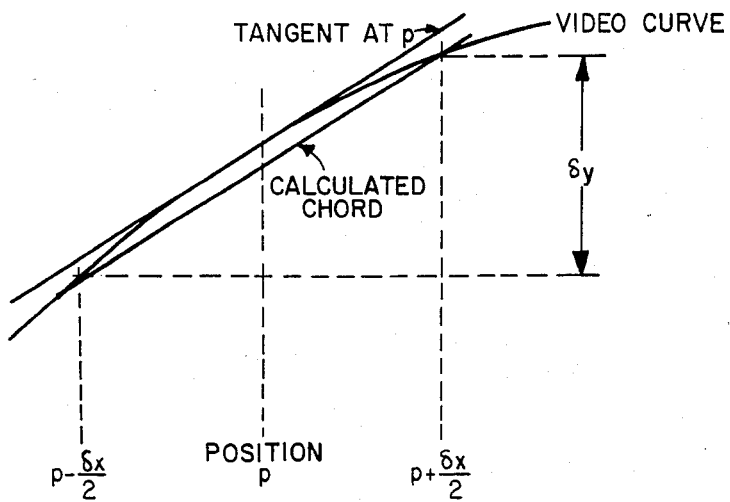
FIG. 4c is a diagram illustrating how the linear interpolation method gives a good approximation of the position of the actual edge.

FIG. 4c shows how the slope of the curve is calculated. For any photosite position P the chord between equidistant positions on either side of the position P will have approximately the same slope as the tangent to the curve at position P. The slope of the curve at position P may therefore be calculated approximately with reasonable accuracy by dividing the amplitude difference between the signal values at the enclosing photosites by the difference in count numbers between these photosites, i.e. 2 in this example. It is possible to effect linear interpolation between photosites which are not immediately adjacent the peak-value position and this can be advantageous to avoid false readings caused by local defects or edge cracking.

Figure 5:
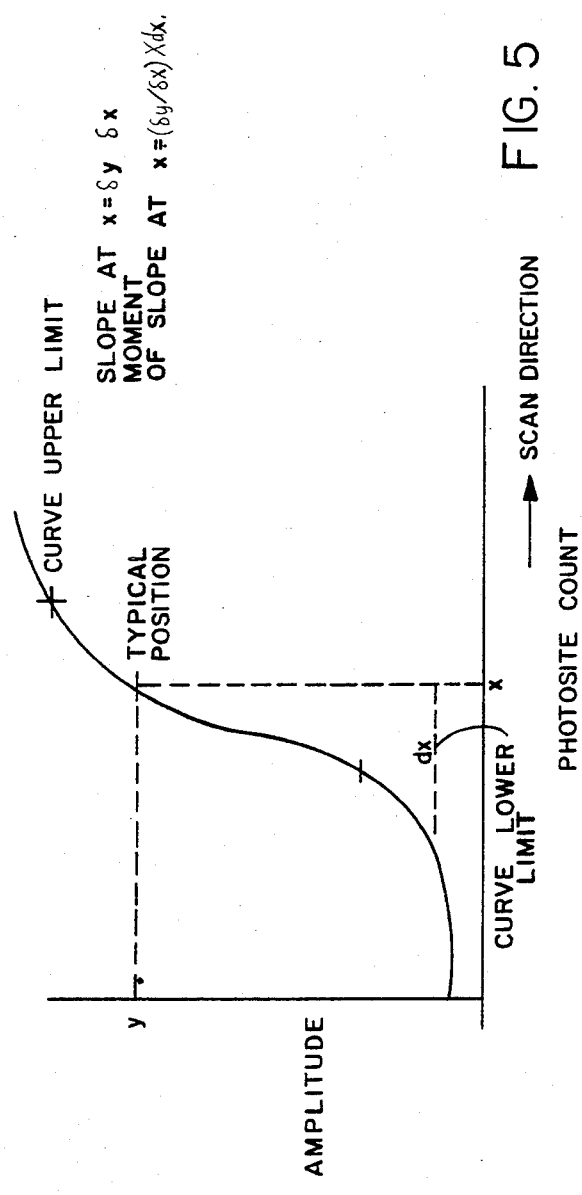
FIG. 5 is a diagram representing the edge region of the strip illustrating an alternative method of determining the actual position of the edge.

An alternative method of interpolating to find the accurate position of the edge is shown in FIG. 5. The upper and lower curve working limits are found in exactly the same manner as in the linear interpolation method by the arrangement shown in FIG. 7b. However, once these positions have been found, the slope of the curve is calculated at each photosite position. This may be calculated from the curve values at enclosing photosites as described with reference to FIGS. 4c and 7b. Unit 73 sets the pointer of the register controlling the accessing of a stack storing the photosite levels in the working region to the curve lower limit position and an end-stop to the upper limit position. Unit 75 calculates the slope dy/dx and the moment of the slope, i.e. (dy/dx)DX at successive photosite positions. The results of these calculations are stored in respective summing registers 76. Unit 77 ensures that the calculation is repeated for the each photosite position until the end-stop is reached which is determined by the unit 78. When this occurs the summing registers contain values equal to the sums of the slopes and of the moments of the slope over the whole working region. The sums of the moments of slopes are then divided by the sums of the slopes over the curve working region in unit 79 and the result added to the curve lower limit position in unit 89. The result of this calculation gives the value x of the exact position of the edge as a fraction of the photosite count numbers. This is then fed to the unit 70 of FIG. 7a where it is rounded to one sixteenth of the photosite pitch before being fed to the dynamic averaging stack 71 and the dispaly unit 72. This method has the advantage over the linear interpolation method that it compensates for spurious signals which may arise at some of the photosites. If such a signal happens to arise at a photosite in the linear interpolation method which lies at the predetermined fraction slope value of the peak slope, it will give rise to an inaccuracy in the calculated position of the edge.

In the edge region cracking may occur which gives rise to a spurious peak 9' in the radiation profile as shown in FIG. 2b. The edge detection apparatus is preferably arranged to disregard this spurious peak. This can be achieved by moving outwards along the curve from the threshold value and determining the slope dy/dx for five pairs of photosites. The slopes between these adjacent photosites are summed and if the resulting sum is greater than or equal to a predetermined number, the memory accessing pointer is assumed to be in the noise region, i.e., on the curve base and it then moves into the steel region differentiating as previously described to find the photosite position corresponding to maximum slope.

In an alternative method, the best fit function $y=f(x)$ can be calculated for the curve between the curve upper and lower limits. The point of inflection, or position of maximum slope, may then be calculated by setting the second order of differential $d2y/dx2=0$ and solving for x. This method also compensates for spurious signals from individual photosites and gives the exact position as a fraction of the photosite count number.

In the embodiments described the cameras are responsive to the radiation emitted from a hot steel strip being worked, usually rolled, in a steel mill. The cameras can however operate on radiation reflected from a strip which is not self luminous. The radiation is normally light although it can of course be electromagnetic radiation lying outside the visible region, or any other form of radiation such as ultrasonic radiation.

As will be evident the invention can be implemented with off-the-shelf discrete logic components or by employing microprocessor technology.

In this specification the term strip is intended to cover any generally elongate object having a width dimension which can be continuously monitored as it moves under the cameras and, in particular, includes bars, slabs and the like.

It has been found in practice that even with the precautions described above, some spurious edges can be detected. To clean the output signal still further, it is possible in an alternative embodiment of the invention to compare the mean signal slope about a point identified as an edge with an average value of slope derived from the previously identified edges and to reject any edge when the mean slope differs excessively from the average value.

A further correlation may be carried out taking advantage of the stereoscopic width measurement. It is not advisable to correlate the measured width of a strip from one scan to the next on a single camera because considerable changes can be caused by the strip lifting off the bed of the rolling mill. In the apparatus described in FIG. 1, however, the strip width can be measured by locating the position in space of the edges (even if they have lifted off the bed) and calculating the distance between these spatial points. Such width measurement may validly be employed in avoiding spurious edge detection. The computed width of the strip may be compared with an expected value derived from the previously computed widths and a detection rejected if there is an excessive difference. Because it is possible for discontinuities to appear rapidly, it is preferable to stop width correlation if several consecutive suspected errors occur.

I claim:

1. A method of determining the precise location of an edge of a strip, comprising scanning the strip at least in the region of the edge with individual elements of a radiation responsive sensor, each said element generating a signal value associated therewith for each scan, said signal values for all the elements forming a composite signal having discrete values representative of radiation received from the scanned region at respective locations corresponding to the individual elements of the sensor, analysing said composite signal by defining a curve which when said values are plotted against said locations on a distance scale passes through said values to represent a radiation profile of the scanned region as received by the sensor, finding the point of maximum slope on said curve, and taking the corresponding position on the distance scale as representing the precise location of said edge to an accuracy exceeding the element pitch.

2. A method according to claim 1 further including identifying a region of interest on said curve where said edge is likely to lie and finding said point of maximum slope on said curve in said region of interest.

3. A method according to claim 2 wherein the region of interest is identified by comparing said composite signal with a predetermined threshold value selected such that said edge is not likely to be located on an element giving a signal value less than said threshold value.

4. A method according to claim 3 wherein said threshold value is set at about 25% of the peak value of a complete scan across the field of view of said sensor.

5. A method according to claim 2 wherein the elements are analyzed progressively towards the centre of the strip from the element at the threshold value to find the element where the slope is a maximum, and then elements are located on either side of the element of maximum slope where the slope falls to a predetermined fraction of its maximum value to define upper and lower working curve limit positions.

6. A method according to claim 5 wherein the upper and lower working curve limit positions are defined where the slope of the curve falls to 50% of its maximum value in the region of interest.

7. A method according to claim 5 wherein prior to locating the element where the slope is a maximum the elements outside the element at the threshold value are anaylzed by determining the slope between adjacent pairs of elements, summing the slopes over a predetermined number of pairs of elements and establishing whether the resulting sum is greater than or equal to a predetermined value to ensure that these elements lie in the noise region and therefore the base region of the curve.

8. A method according to claim 5 or 6 wherein the point of maximum slope is found to an accuracy exceeding the element pitch by taking the difference between the signal values at said limit positions, multiplying by a predetermined constant, adding the result to the signal value at said lower limit position to find the value on said curve where the actual edge is located, locating the elements enclosing said value on said curve at the position of the actual edge, and effecting linear interpolation between said enclosing elements.

9. A method according to claim 5 or 6 wherein the point of maximum slope is found to an accuracy exceeding the element pitch by finding the mean of the signal values at said limit positions, locating the elements enclosing said mean value, and effecting linear interpolation between said enclosing photosites.

10. A method according to claim 5 or 6 wherein the slopes and moments of slopes are found at the elements between the upper and lower limit positions, the respective sums of said slopes are taken, and the sum of the moments is divided by the sum of the slopes to find the position of the edge directly as a fraction of the element pitch.

11. A method according to claim 2 comprising analysing said discrete values in said region of interest to find the best fit curve passing therethrough $y=f(x)$, where y represents the value of the function and x represents the distance along said distance scale, setting the second order differential $d2y/dx2$ equal to zero, and solving for x to determine the precise location of the edge.

12. A method of determining the accurate location of an edge of a strip, comprising scanning the strip at least in the region of the edge with individual elements of a radiation responsive sensor, each said element generating a signal value associated therewith for each scan, said signal values for all the elements forming a composite signal having discrete values representative of the radiation from the scanned region at locations corresponding to the individual elements of the sensor, analysing said composite signal by finding a first said discrete value corresponding to a first said element where the rate of change of said signal values between adjacent said elements is a maximum, finding second said discrete signal values corresponding to second said elements on either side of said first discrete value where the rate of change of said signal values between adjacent elements is a predetermined fraction of said maximum, taking the mean of said second discrete values to find a final value, and if said final value is exactly equal to any one of said discrete values taking the precise location of said edge as being at the centre of the corresponding element, and if said final value does not exactly equal any one of said discrete values interpolating to find the precise location of the edge as a fraction of the element pitch.

13. A method according to claim 12 wherein the interpolation is carried out between elements having corresponding discrete values closest to said final value.

14. A method according to claim 11 further including identifying a region of interest on said composite signal where said edge is likely to lie and analysing said composite signal in said region of interest.

15. A method according to claim 14 wherein the region of interest is found by taking a threshold value equal to about 25% of the peak signal value in each scan.

16. A method according to claim 14 wherein prior to locating the element where the rate of change of signal values is a maximum the elements outside the region of interest are analysed in a direction away from the centre of the strip by differentiating the signal values between adjacent elements in pairs over a predetermined number of pairs, summing the differentiated values and establishing whether the resulting sum is greater than or equal to a predetermined number to ensure that these elements lie in the noise region and hence the base region of the composite signal.

17. A method of determining the accurate location of an edge strip, comprising scanning the strip at least in the region of the edge with individual elements of a radiation responsive sensor, each said element generating a signal value associated therewith for each scan, said signal values for all the elements forming a composite signal having discrete values representative of the radiation from the scanned region at locations corresponding to the individual elements of the sensor, analysing said composite signal by calculating the rate of change of signal $dy/dx$ at each element and the moment of the rate of change of signal $(dy/dx)dx$ at each element, respectively summing said rates of change and moments of rates of change, and dividing the sum of the moments by the sum of the rates of change to derive the actual position of the edge directly as a fraction of the element pitch.

18. A method according to claim 15 further including a region of interest where said edge is likely to lie and analysing said composite signal in said region of interest.

19. A method according to claim 18 wherein the region of interest is identified by taking a threshold value equal to about 25% of the peak signal value in each scan.

20. An apparatus for determining the accurate location of an edge of a strip, comprising a radiation responsive sensor having a plurality of individual elements for scanning the strip at least in the region of the edge, each said element generating a signal value associated therewith for each scan, the signal values for all the elements forming a composite signal having discrete values representative of the scanned region at locations corresponding to the individual elements of the sensor, means for analysing said signal to find a first said discrete value corresponding to a first said element where the rate of change of said signal values between adjacent said elements is a maximum, means for finding second said discrete values corresponding to second said elements on either side of said first discrete value where the rate of change of said signal values between adjacent elements is a predetermined fraction of said maximum to define upper and lower working curve limit values, means for taking the mean of said second discrete values to find a final value, and means for determining the precise location of said edge, said determining means being arranged such that if said final value is exactly equal to any one of said discrete values, it takes the centre of the corresponding element as representing the precise location of said edge, and if said final value does not exactly equal any one of said discrete values it finds the precise location of said edge as a fraction of the element pitch by linear interpolation.

21. An apparatus according to claim 17 including means for identifying a region of interest where said edge is likely to lie and wherein said means for analysing said signal analyses said signal in said region of interest.

22. An apparatus according to claim 21 wherein said means for identifying said region of interest comprises a comparator for comparing said composite signal with a predetermined threshold value.

23. An apparatus according to claim 22 wherein said predetermined threshold value is set at about 25% of the peak value of the signal in each scan.

24. An apparatus according to claim 22 further comprising means for checking that said threshold value lies at the bottom of a curve defining the edge region comprising means for differentiating the signal values between pairs of elements moving in a direction away from the centre of the steel from the threshold value, means for summing the differentiated values, and means for establishing whether the resulting sum is greater than or equal to a predetermined value to ensure that these elements lie in the noise region and therefore on the base of the curve.

25. An apparatus according to claim 20 wherein said determining means interpolates between the elements having corresponding discrete values closest to said final value.

26. An apparatus according to claim 20, 25 or 22 wherein the radiation responsive sensor is a charge-coupled-device camera.

27. An apparatus for determining the accurate location of an edge of a strip, comprising a radiation responsive sensor having a plurality of individual elements for scanning the strip at least in the region of the edge, each said element generating a signal value associated therewith for each scan, the signal values for all the elements forming a composite signal having discrete values representative of the scanned region at locations corresponding to the individual elements of the sensor, means for analysing said signal to find a first said discrete value corresponding to a first said element where the rate of change of said signal values between adjacent said elements is a maximum, means for finding second said discrete values corresponding to second said elements on either side of said first discrete value where the rate of change of said signal values between adjacent elements is a predetermined fraction of said maximum to define upper and lower working curve limit values, means for calculating the rates of change of signal $dy/dx$ and the moments of the rates of change $(dy/dx)dx$ at the elements between the upper and lower limit values, summing registers for storing the respective sums of said rates of change and said moments of rates of change, and divider means for dividing the sum of said moments by the sum of said rates of change to calculate the accurate position of the edge directly as a fraction of the element pitch.

28. An apparatus according to claim 23 including means for identifying a region of interest where said edge is likely to lie and wherein said means for analysing said signal analyses said signal in said region of interest.

29. An apparatus according to claim 28 wherein said means for identifying said region of interest comprises a comparator for comparing said composite signal with a predetermined threshold value.

30. An apparatus according to claim 24 wherein said predetermined threshold value is set at about 25% of the peak value of the signal in each scan.

31. An apparatus for finding the precise location of an edge of a strip, comprising a radiation responsive sensor having a plurality of individual elements for scanning the strip at least in the region of the edge, each said element generating a signal value associated therewith for each scan, the signal values for all the elements forming a composite signal having discrete values representative of the radiation from the scanned region at locations corresponding to the individual elements of the sensor, means for analysing said composite signal by defining a curve which when said values are plotted against said locations on a distance scale passes through said values to represent a radiation profile of the scanned region, and means for finding the point of maximum slope on said curve, said point being taken as the precise location of said edge.

32. An apparatus according to claim 26, including means for identifying a region of interest on said curve where said edge is likely to lie.

33. An apparatus according to claim 32 wherein said means for identifying the region of interest comprises a comparator for comparing said composite signal with a predetermined threshold value.

34. An apparatus according to claim 27 wherein said predetermined threshold value is set at about 25% of the peak value of the signal in each scan.

35. An apparatus according to claim 31, 33 or 34 comprising means for finding a best fit curve $y=f(x)$ through said discrete values where y represents the value of the function and x represents the distance along said scale, means for finding the second order differential $d2y/dx2$, and means for setting the second order differential equal to zero and solving for x to determine the precise location of said edge.

* * * * *

UNITED STATES PATENT AND TRADEMARK OFFICE
CERTIFICATE OF CORRECTION

PATENT NO. : 4,499,383

DATED : Feb. 12, 1985

INVENTOR(S) : Peter W. Loose

It is certified that error appears in the above-identified patent and that said Letters Patent are hereby corrected as shown below:

Column 1, line 31, after "of" insert --a--

Column 2, line 43, change "informatiion" to --information--

Column 6, line 9, change "4" to --4a--

Column 6, line 45, change the formula to read as follows:

$$(\theta-a_1/a_u-a_1)=(e-p_1/p_u-p_1).$$

Column 10, line 15, change "Claim 11" to --Claim 12--

Column 10, line 51, change "Claim 15" to --Claim 17--

Column 11, line 19, change "Claim 17" to --Claim 20--

Column 12, line 15, change "Claim 23" to --Claim 27--

Column 12, line 24, change "Claim 24" to --Claim 29--

Column 12, line 43, change "Claim 26" to --Claim 31--

UNITED STATES PATENT AND TRADEMARK OFFICE
CERTIFICATE OF CORRECTION

PATENT NO.  : 4,499,383
DATED       : Feb. 12, 1985
INVENTOR(S) : Peter W. Loose It is certified that error appears in the above-identified patent and that said Letters Patent are hereby corrected as shown below:

Column 12, line 50, change "Claim 27" to --Claim 33--

Signed and Sealed this

Eighteenth Day of June 1985

[SEAL]

Attest:

DONALD J. QUIGG

*Attesting Officer*  *Acting Commissioner of Patents and Trademarks*